Patented Dec. 18, 1951

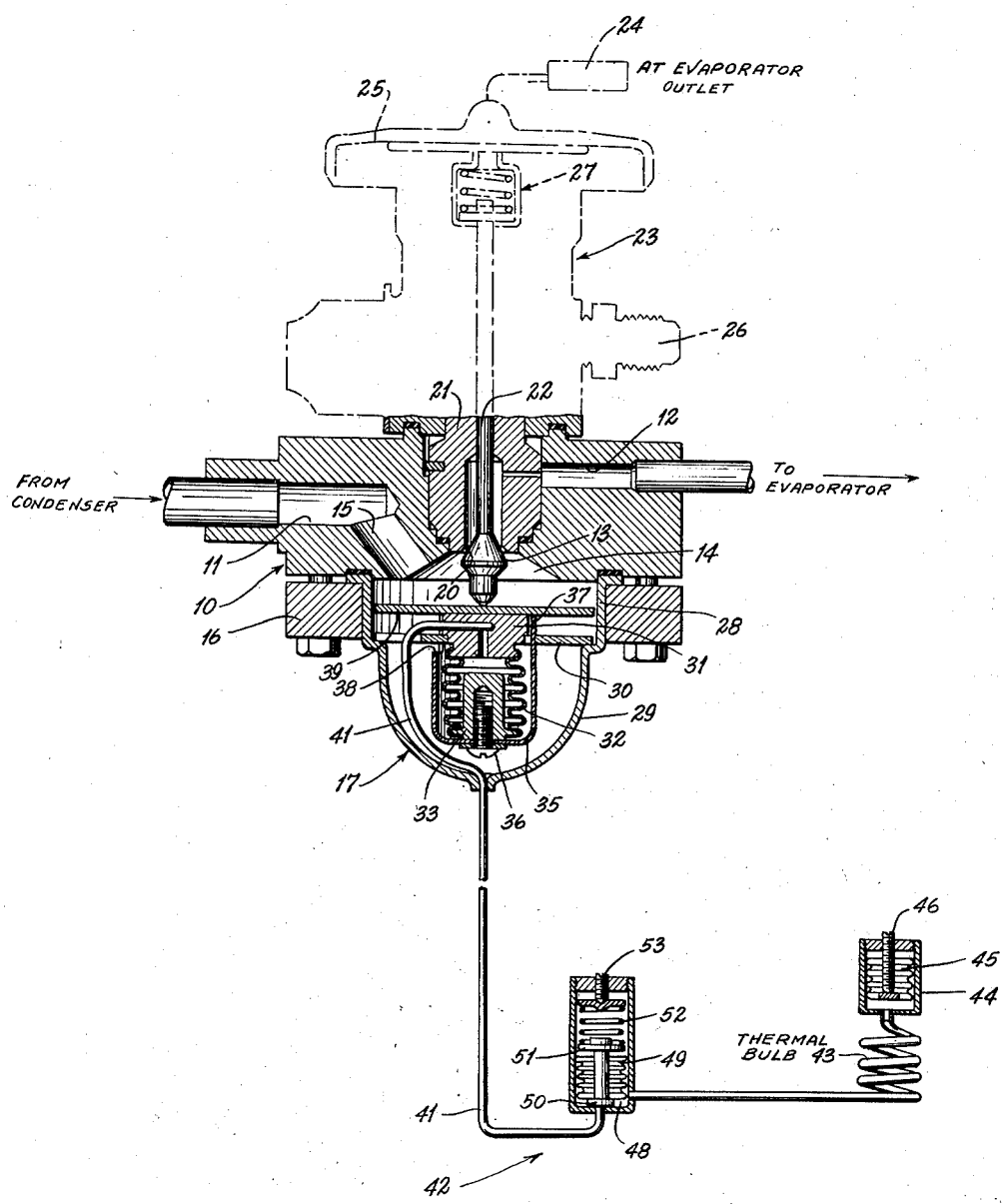

2,579,034

UNITED STATES PATENT OFFICE 2,579,034

MULTIPLE RESPONSE OVERRIDE FOR THERMAL VALVES

John E. Dube, Chesterfield, and George D. Bower, University City, Mo., assignors to Alco Valve Company, University City, Mo., a corporation of Missouri Application June 8, 1945, Serial No. 598,318

20 Claims. (Cl. 62—8)

The present invention relates to a multiple response override which has particular use in connection with thermal valves. More particularly, it relates to a combination of a thermal valve with an override control designed to operate the thermal valve in opposition to its inherent operating means when certain temperature and pressure extremes are exceeded.

It is an object of this invention to provide an override for a thermal valve that will force closure of the valve when certain temperature conditions exceed a predetermined minimum value and when certain pressure conditions exceed a predetermined maximum value. It is a particular object to provide such a control that is operated to close a main thermal valve when the inlet pressure to the thermal valve exceeds a certain maximum value, or when the temperature of a medium being refrigerated, under control of the thermal valve, attains a certain minimum value.

It is a further object to attain the foregoing with a single control independently responsive to the foregoing pressure and temperature conditions.

This invention is related to the invention in a co-pending application, Serial No. 598,494, filed June 9, 1945, in the names of the present inventors plus Franklin M. MacDougall, and which has now matured into Patent No. 2,529,378, granted November 7, 1950.

The drawing is a transverse section through the invention with the thermal valve shown in dotted lines.

In the drawings, a valve body is shown at 10. It has an inlet 11 adapted to be connected from the condenser or the like of a refrigeration system. It has an outlet 12, adapted to be connected to the evaporator of a refrigeration system. Communication between the inlet and the outlet is under control of a main valve 13, which may be, and usually is, an expansion valve. The valve 13 operates within an inlet valve chamber 14 formed as a cut-out portion in the bottom of the valve housing 10 and connected by a port 15 with the inlet 11. The inlet chamber 14 is closed by a cover 16 which contains a cup 17 flanged at its upper end and clamped by the ring-like member 16 between itself and the valve body 10.

The valve 13 cooperates with a valve seat 20 within an insert 21 fitted non-rotatably in a cutout within the valve body 10. The valve 13 is supported by a valve stem 22 that is operated by a thermal valve 23. This thermal valve is not here described in detail because it is completely set forth in the co-pending application referred to. It has a bulb 24 adapted to be located at some suitable point, such as at the evaporator outlet. The bulb operates a diaphragm 25 which is subjected on its lower side to some pressure introduced through an external equalizer line 26 and to a spring pressure, all as is known in the art. As described in the co-pending application, there is a yielding connection 27 between the diaphragm and the valve stem 22 to permit the valve stem to yield upwardly resiliently, despite the fact that the operating means or diaphragm of the thermal valve may be in lowered or expanded condition.

It will be understood that the conventional thermal valve 23 operates to maintain a constant superheat within the refrigeration system by modulating the position of the expansion valve 13.

The override mechanism is disposed within the cup 17. It has an upper cylindrical portion 28 and a lower substantially hemispherical portion 29. A partition 30 is fixedly supported at a shoulder between the cylindrical portion 28 and the hemispherical portion 29. The partition supports a fixed bellows head 31. This bellows head forms the upper closure to a bellows 32, the lower end of which is attached to a lower movable bellows head 33. The lower bellows head 33 projects upwardly within the bellows 32 to limit the collapsing movement of the bellows.

A cup 35 is secured at its lower end outside of the bellows head 33 to which it is attached by a screw 36. The cup 35 has legs 37, three or four in number, that project through slots within the fixed partion 30. It will be seen that the lower edge 38 of the cup member 35 is disposed a distance below the partition 30, so that the cup member may move upwardly when the bellows 32 is contracted. A pressure plate 39 rests on the upper end of the legs 37 of the cup member 35. This pressure plate rides within the cylindrical portion 28 of the cup member 29, and is adapted to abut the lower end of the main valve 13, and compress the same upwardly when it, the pressure plate, moves upwardly.

The upper bellows head 31 has passages therein through which a capillary, or the like, tube 41 communicates with the interior of the bellows. The tube 41 is adapted to be connected to a remote control mechanism 42 of a type shown in the co-pending application referred to. It is schematically presented in the present drawing as including a thermal bulb 43 in the form of a coil, preferably located at some point so that it will respond to the temperature of the medium being refrigerated near the evaporator coil. For example, the bulb 43 may be located in a duct conveying return air to the evaporator. The coil 43 opens into a container 44, the volume of which is adapted to be adjusted. This adjustment is effected by a bellows 45 that may be expanded or contracted by an adjusting screw 46, thereby changing the displacement of the bellows and hence the effective volume of the container 44.

Between the bulb 43 and the capillary 41, an expansion chamber 48 is disposed. It is closed by a bellows 49 having a head 50 that is united to a lower spring abutment 51 urged downwardly by a coil spring 52, the initial compressive force of which is adjustable by an adjusting screw 53.

The entire interior of the main bellows 32, the capillary 41, the expansion chamber 48, the coil 43, and the container 44 form a thermal liquid system that is completely filled with a liquid that normally does not vaporize within the normal operating range of the system. In other words, it is a solid charge that delivers great power without compressibility.

*Operation*

The operation of this mechanism is as follows:

As already stated, the thermal valve 23 operates in response to temperature conditions at the evaporator outlet and to pressure conditions somewhere in the evaporator line to position the valve 13 so that it will maintain a constant superheat at the evaporator outlet. Of course, the mechanism may be used with other valves, but it has peculiar value in connection with a thermal valve of the kind described.

It will be seen that inlet refrigerant pressure is admitted to the cup 29 so that it acts upon the outside of the operating bellows 32, tending to contract the same. The contraction is, under normal conditions, opposed by the pressure in the thermal liquid system. Ordinarily the inlet pressure is below a desired maximum and the temperature at the bulb 43 is above a desired minimum. Should the load on the evaporator decrease so that the temperature at the thermal bulb 43 decreases toward a desired minimum, the liquid within the thermal system will contract, permitting the bellows 32 to contract. After a predetermined contraction of the bellows 32, the resultant upward movement of the cup 35 and the pressure plate 39, the latter will abut the lower end of the valve 13. Thereafter, further contraction of the thermal liquid will begin to throttle the valve 13. The valve will be forced upwardly against the operating diaphragm 25 of the thermal valve 23, in effect, causing an increase in the superheat setting of the valve, until the gas pressure in the bulb 24 is sufficient to push the diaphragm 25 against its lower stop in opposition to the pressure exerted by the spring 27. After this has taken place, the valve operates simply as a pressure or temperature controlled unit.

Should the temperature at the thermal bulb decrease until it attains a certain predetermined minimum, the operating bellows 32 may contract to such a point that the pressure plate 39 forces the valve 13 all the way closed. The valve will remain closed until the temperature at the bulb 43 rises above the desired minimum, whereupon it will again be permitted to open by the temperature override system. The critical minimum temperature may be adjusted by adjusting the screw 46 and thereby changing the displacement of the container 44 and the initial disposition of the bellows 32.

When the inlet pressure increases beyond a certain maximum value, it will produce a pressure that exceeds the liquid pressure within the bellows 32. This liquid pressure is always a function of the force exerted by the coil spring 52 within the remote control mechanism. Hence, when the force exerted by the spring 52 is less than that opposing it in the liquid, the bellows 49 will be contracted. A maximum inlet pressure, therefore, may collapse the main bellows 32 by forcing the liquid therein back outwardly into the expansion chamber 48, collapsing the bellows 49 against the spring 52. This collapse of the bellows 32 also effects throttling and closure of the valve 13.

It will be seen that this main valve 13 is overridden by either a maximum inlet pressure condition or a minimum developed temperature condition. It will also be seen that the two operations, although effected through the same power mechanism, are independent of each other for all practical purposes. Hence, when inlet pressure reaches a value that would overload the compressor motor, the main valve 13 is throttled or closed, so that the load on the motor is reduced or cut off to prevent injury to the motor. Likewise, should the load on the evaporator decrease, resulting in excessive cooling of the air or other medium being refrigerated, the evaporator will be starved by the thermal override until the proper temperature range is restored.

This form of the invention has the virtue of simplicity as compared with the co-pending application mentioned. However, it is not capable of use with as wide a range of temperature and pressure conditions because all of the power for the override must be generated within the bellows 32 in terms of the contraction of the thermal liquid opposed by the inlet pressure. However, within a narrower range, this control is very satisfactory.

What is claimed is:

1. In a mechanism of the kind described, a valve adapted to regulate flow between an inlet and an outlet, means for operating said valve in one direction in response to predetermined conditions, an override means to return said valve in the opposite direction despite the condition of the operating means, said override means including a pressure-responsive movable wall subjected on one side to the inlet pressure, thermally-responsive means including a thermally expansible fluid on the opposite side of the wall, and abutment means connecting the wall and the valve for operation of the valve in said opposite direction upon reduction in temperature of the thermal fluid, or upon increase in inlet pressure, beyond predetermined extreme values of each.

2. In a mechanism of the kind described, a valve adapted to regulate flow between an inlet and an outlet, means for operating said valve in one direction in response to predetermined conditions, an override means to return said valve in the opposite direction despite the condition of the operating means, said override means including a pressure-responsive movable wall subjected on one side to inlet pressure, thermally-responsive means including a thermally expansible fluid on the opposite side of the wall, and abutment means connecting the wall and the valve for operation of the valve in said opposite direction upon reduction in temperature of the thermal fluid, or upon increase in inlet pressure, beyond predetermined extreme values of each, said thermal fluid comprising an incompressible liquid, and yieldable means adapted to apply pressure on the liquid, said pressure determining the extreme inlet pressure at which the override means will move the valve in said opposite direction.

3. In an override mechanism, a fluid pressure receiving housing having an inlet and an outlet, a valve controlling flow through the housing, means to effect movement of the valve including a movable wall in the housing, a pressure chamber on each side of the wall, a thermal fluid system including one of said pressure chambers, and a thermal bulb means, said system being filled with a thermally expansible fluid, the housing having means admitting fluid under pressure to the other chamber, whereby said wall will be moved when the difference in the pressures in said chambers reaches a predetermined value, and means adapted to apply at least substantially a predetermined pressure to the thermal fluid greater than the normal pressures of the fluid in the other chamber and equal to desired maximum pressures in said other chamber, said means being yieldable to relieve pressures in the thermal fluid when it exceeds said predetermined value.

4. In a mechanism of the kind described, a valve, yieldable power means for normally moving the valve to one position and return, an abutment device adapted to engage said valve and move the same oppositely to its movement by the yieldable power means, a movable wall for effecting operation of the abutment device, a first pressure chamber subjected to an expansible thermal fluid and disposed for operating the movable wall in one direction in response to increase in pressure produced by the thermal fluid, a second pressure chamber disposed oppositely to the first chamber with respect to the movable wall, subjected to a fluid under pressure controlled by the valve for operating the movable wall in the opposite direction in response to increase in said fluid under pressure.

5. In a mechanism of the kind described, a thermal valve for use in refrigeration systems, yieldable power means for normally moving the valve in opening and closing directions in response to changes in superheat in the refrigeration system, an abutment device adapted to engage said valve and move the same toward closed position, a movable wall for effecting operation of the abutment device, a first pressure chamber subjected to an expansible thermal fluid for operating the movable wall in one direction, a second pressure chamber subjected to a fluid under pressure controlled by the valve for operating the movable wall in the opposite direction.

6. In a valve mechanism, a housing, an inlet, an outlet, a valve controlling fluid flow through the housing from the inlet to the outlet, main means to move the valve in one direction and back, low-force, yieldable connection between the main means and the valve, overriding means to return the valve in the other direction by deformation of the low-force connection without substantial change in the position of the main means, said overriding means including an abutment movable into the path of the valve, thermal means to move the abutment responsive to changes in temperature, and also including means responsive to changes in pressure in the fluid in the housing, said overriding means being adapted to position the abutment against the valve to return the valve despite the condition of the main means, and having means to withdraw the abutment from the valve.

7. In a valve, a valve casing having an inlet and an outlet, and a valve movable to vary the flow of fluid from the inlet to the outlet, first means responsive to changes in predetermined conditions to position the valve, a low-force yieldable connection between said means and the valve, said connection including means to limit the relative movement of the valve and the said means so that the valve and means normally move as a fixed unit, second means to position the valve including a movable wall, a closed fluid-containing system having a first pressure chamber on one side of the wall to receive the control fluid under pressure and move the wall in a first direction upon increase in such pressure, means to connect the other side of the wall to a source of variable fluid pressure, whereby said wall is moved in a second direction opposite the first, in response to increase in said pressures, the second means having much greater force than the low-force connection so as to freely displace the valve by deformation of said connection; and the closed fluid-containing system having means to set a predetermined maximum to the force resisting movement of the wall in the one direction aforesaid, whereby said wall may yield to maximum pressures.

8. In a valve, a valve casing having an inlet and an outlet, and a valve movable to vary the flow of fluid from the inlet to the outlet, first means responsive to changes in predetermined conditions to position the valve, a low-force yieldable connection between said means and the valve, second means to position the valve including a movable wall, a closed fluid-containing system having a first pressure chamber on one side of the wall to receive the control fluid under pressure and move the wall in a first direction upon increase in such pressure, means to connect the other side of the wall to a source of variable fluid pressure, whereby said wall is moved in a second direction opposite the first, in response to increase in said pressures; and the closed fluid-containing system having means to set a predetermined maximum to the force resisting movement of the wall in the one direction aforesaid, whereby said wall may yield to maximum pressures, said means to connect the other side of the movable wall to a source of variable fluid pressure comprising passage means from the wall to the inlet side of the valve.

9. In a refrigeration system for cooling a space, a refrigerant flow control valve for varying the supply of liquid to an evaporating portion of the system, valve actuating means including an expansible and contractible device, a fluid system connected therewith containing a fluid that expands and contracts in response to temperature changes of the refrigerated space to cause expansion and contraction of the device, means to apply a predetermined pressure to the fluid, said means being yieldable to permit collapse of the expansible and contractible device in response to forces applied thereto, means to subject the expansible device to forces derived from the varying head pressures in the system, whereby such head pressures may cause contraction of the expansible device, and means to apply movements of the expansible device to the valve.

10. In a refrigeration system for cooling a space, a refrigerant flow control valve for varying the supply of liquid to an evaporating portion of the system, valve actuating means including a movable wall and a pressure chamber on one side of the wall, a liquid system connected with said chamber and containing a liquid expansible and contractible in response to temperature of the refrigerated space, to move said wall, yieldable means applying a predetermined pressure to said liquid, means to apply a force to said wall that corresponds to varying head pressures in the system, in opposition to the pressures on the wall from said yieldable means, whereby said wall may respond to changes in temperature of the space and changes in head pressure, and means to apply movements of the wall to the valve.

11. In a refrigeration system for cooling a space, a refrigerant flow control valve for varying the supply of liquid to an evaporating portion of the system, valve actuating means including a movable wall and a pressure chamber on one side of the wall, a liquid system connected with said chamber and containing a liquid expansible and contractible in response to temperature of the refrigerated space, to move said wall, yieldable means applying a predetermined pressure to said liquid, means to apply a force to said wall that corresponds to varying head pressures in the system, in opposition to the pressures on the wall from said yieldable means, whereby said wall may respond to changes in temperature of the space and changes in head pressure, and means to apply movements of the wall to the valve, said last-named means comprising a one-way connection capable of moving the valve in only one direction.

12. In a control for a refrigeration system, a head pressure refrigerant line, an expansion valve, an evaporator line, primary means to regulate the position of the expansion valve in response to temperature at the evaporator outlet, and evaporator pressure to maintain a constant superheat in the evaporator, overriding means including a pressure-responsive movable wall, means subjecting the wall to head pressure from said head pressure line, means to apply movements of the wall to the valve to throttle the same when said head pressure exceeds predetermined values, and a yieldable connection between the primary means and the valve to enable the valve to be throttled as aforesaid without substantial disturbance of the primary means, and the movements of the wall may be effected without substantial influence of the primary means.

13. In a control for a refrigeration system, a head pressure refrigerant line, an expansion valve, an evaporator line, primary means to regulate the position of the expansion valve in response to temperature at the evaporator outlet, and evaporator pressure to maintain a constant superheat in the evaporator, overriding means including a pressure-responsive movable wall, means subjecting the wall to head pressure from said head pressure line, means to apply movements of the wall to the valve to throttle the same when said head pressure exceeds predetermined values, and a yieldable connection between the primary means and the valve to enable the valve to be throttled as aforesaid without substantial disturbance of the primary means, and the movements of the wall may be effected without substantial influence of the primary means, said means to apply movements of the wall to the valve comprising a one-way limiting device that can act only in a throttling direction on the valve, whereby the valve may be freely operated by the primary means up to the limits imposed by the limiting device.

14. In a refrigeration system of compressor-condenser-evaporator type, a refrigerant flow control valve, control means for said valve responsive to superheat and control means for said valve arranged to effect control movements thereof in direct response to changes in head pressure in the system.

15. In a refrigeration system arranged for space cooling, and including a compressor, a condenser and an evaporator, together with an expansion valve in a closed refrigerant circuit, a superheat control including a valve actuating motor and fluid pressure actuating means therewith responsive to superheat in the system; a second fluid motor having an operating connection with said valve and an energizing fluid connection between the last said motor and a head pressure zone of the system.

16. In a mechanism of the kind described for use in a refrigeration system which system has a compressor and an evaporator, the combination of a valve mechanism for interposition between the compressor and evaporator, the valve mechanism including a valve housing, a valve therein, and means to position the valve to maintain constant superheat in the evaporator; and combined pressure- and temperature-responsive means to move the valve toward closed position in response either to excessive pressure on the inlet side of the valve or to excessive cooling capacity of the system.

17. In a refrigeration system arranged for cooling a space, and including a compressor, a condenser, an evaporator arranged in a closed circuit constituting a first fluid system, a refrigerant flow control valve, a valve operating member, a second fluid system including a fluid motor, a portion of the second said system being located to act responsively to temperature of the space under refrigeration, a third fluid system including a motor member connected into the first system so as to act in response to variations in head pressure therein, said motor members being arranged to act in opposing relation, and connections from the motor members to the refrigerant control valve.

18. In a refrigeration system arranged for cooling a space, and including a compressor, a condenser and an evaporator arranged in a connected system, a refrigerant flow control valve in said system, a valve operating member, a fluid control system, including a fluid motor, a portion of the last said system being responsive to temperature of the space under refrigeration, an additional fluid control system including a fluid motor connected into the last said system so as to act in response to variations in head pressure therein, said fluid motors being arranged to act in opposing relation, and connections from the motors to the refrigerant control valve so arranged in respect to the valve as to constitute a valve operating connection only in one direction of movement of said valve and being substantially free of influence on the valve under conditions requiring an opposite movement of the valve.

19. A liquid flow control assembly for use in a space cooling refrigeration system, said assembly including a refrigerant flow control valve in combination with means for operating said valve in response to superheat conditions in the refrigeration system, valve actuating means responsive to head pressure variations in the refrigeration system, valve actuating means responsive to temperature variations of the cooled space, means providing a common operating connection between said last two valve actuating means and said flow control valve, and means for permitting one of said last two valve actuating means to dominate operation of said common means.

20. In a mechanism of the kind described, a main control device, main means for moving the same, an abutment device adapted to engage said main control device and move the same oppositely to its movement by the main moving means, a movable wall for effecting operation of the abutment device, a closed thermal fluid system including a first pressure chamber subjected to an expansible thermal fluid and disposed for operating the movable wall in one direction in response to increase in pressures produced by the thermal fluid, a second pressure chamber disposed oppositely to the first chamber with respect to the movable wall, subjected to a fluid under pressure controlled by the main control device for operating the movable wall in the opposite direction in response to increase in said fluid under pressure, the closed thermal system including a yieldable expansion device having a second movable wall subjected on one side to the thermal fluid pressure in the closed system and having yieldable force means acting oppositely to the said thermal fluid pressure adapted to apply at least substantially a predetermined yieldable force that provides a thermal fluid pressure greater than the normal pressures of the second pressure chamber and equal to the desired maximum pressures in said second chamber.

JOHN E. DUBE.
GEORGE D. BOWER.

REFERENCES CITED

The following references are of record in the file of this patent:

UNITED STATES PATENTS

| Number | Name | Date |
| --- | --- | --- |
| 920,392 | Rider | May 4, 1909 |
| 990,772 | Pollard | Apr. 25, 1911 |
| 1,350,550 | Hoffman | Aug. 24, 1920 |
| 1,917,893 | Mancib | July 11, 1933 |
| 2,116,802 | Shivers | May 10, 1938 |
| 2,191,925 | Kaufman | Feb. 7, 1940 |
| 2,297,872 | Carter et al. | Oct. 6, 1942 |
| 2,313,391 | Newton | Mar. 9, 1943 |
| 2,319,993 | Kaufman | May 25, 1943 |
| 2,320,055 | Stickel | May 25, 1943 |
| 2,363,010 | Matteson | Nov. 21, 1944 |
| 2,404,596 | Roche | July 23, 1946 |
| 2,443,581 | Lange | June 15, 1948 |